Patented Aug. 30, 1932

1,874,563

UNITED STATES PATENT OFFICE

DE LOSS K. MARTIN, OF WEST ORANGE, NEW JERSEY, ASSIGNOR TO AMERICAN TELEPHONE AND TELEGRAPH COMPANY, A CORPORATION OF NEW YORK

SYSTEM FOR PRODUCING HIGH VOLTAGE DIRECT CURRENTS

Application filed September 25, 1925. Serial No. 58,662.

This invention relates to systems for producing high voltage direct current, and particularly to systems in which a plurality of transformers and rectifiers are employed for obtaining such high voltage direct current from low voltage alternating current.

In former arrangements of such systems, it was possible to obtain high voltage current by connecting the primaries of each of a plurality of transformers in parallel with a primary or exciting source of current, the secondaries of said transformers being connected in series relationship with each other in a separate circuit. When the currents in the transformers were in phase, the potential produced was several times the potential produced by any one of the transformers, the potential depending upon the number of transformers so connected. But in such arrangements, each of the transformers in turn had to be insulated for increasing potentials, the last transformer being insulated for the full potential produced in the arrangement.

It is an object of the present invention to provide a high voltage direct current system in which the voltage for which the entire arrangement is insulated is considerably greater than the voltage for which any one of the transformers employed therein need be insulated.

It is a further object of this invention to so arrange a plurality of transformers and rectifiers with respect to a primary source of low voltage alternating current that high voltage direct current will be easily obtainable.

And it is a further object of the invention to employ a plurality of selective devices along with a plurality of transformers and rectifiers so that the high voltage direct current obtainable will be substantially free from any alternating current waves.

Figure 1:
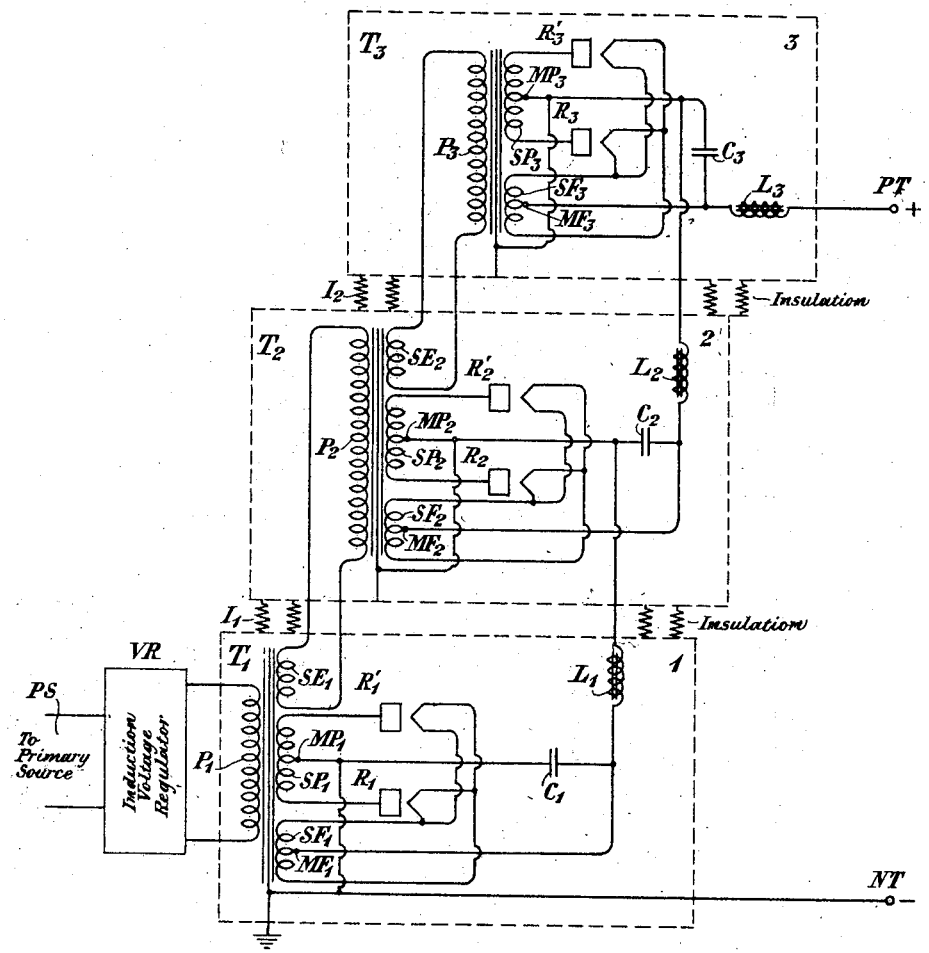

A good understanding of the invention may be had from the detailed description hereinafter following, reference being had to the accompanying drawings, in which Figure 1 is a system for obtaining high voltage direct current from a primary source of single phase alternating current, and Fig. 2 a system for obtaining high voltage direct current from a primary source of three-phase alternating current.

Referring to Fig. 1, there is illustrated a single phase rectifier system including transformers, rectifiers and selective devices. Each group is enclosed by a dashed line which may be a metal container or support for the units which include a transformer, rectifier tubes and a selective device, preferably a low pass filter. Three groups are designated by reference characters 1, 2 and 3. Group 1 is at the ground potential. Group 2 is insulated from Group 1 by means of the insulation $I_1$, and is raised to a potential above ground which is equal to the potential developed in Group 1. Similarly, Group 3 is insulated from Group 2 by means of the insulation $I_2$ and is raised to a potential above ground which is twice that of the potential developed in Group 1.

The transformers $T_1$, $T_2$ and $T_3$ in Groups 1, 2 and 3, respectively, have an arrangement of primary and secondary windings to supply the necessary potential to the various parts of the system. Referring to the transformer $T_1$, the primary $P_1$ is connected to the primary source of power PS, single phase alternating current, through an inductive voltage regulator VR, (the details of which are not shown). By means of the voltage regulator VR, the direct current voltage in the output circuit of the system may be maintained as constant as requirements necessitate. The transformer $T_1$ has three secondary windings $SF_1$, $SP_1$ and $SE_1$. The secondary winding $SF_1$ is connected to the filaments of the rectifier tubes, the potential between the terminals of the secondary winding $SF_1$ being that required to properly heat said filaments to incandescence. The secondary winding $SF_1$ is insulated from the core and the secondary winding $SP_1$ for a potential equal to that developed in the arrangement in Group 1, said potential being determined by the voltage produced in the secondary winding $SP_1$. The secondary winding $SP_1$ is connected to the plates of the rectifier tubes $R_1$ and $R'_1$. The secondary winding $SE_1$ is connected to the primary $P_2$ of the transformer $T_2$ in Group 2, said secondary winding $SE_1$ being employed for supplying the current necessary to excite said primary winding $P_2$. This secondary winding $SE_1$ is also insulated from the core and the primary of the transformer $T_1$ for a potential equal to that developed in Group 1.

A similar arrangement of circuits is employed in Group 2 for further increasing the potential of the direct current in the secondary circuit. Because of the similarity between the elements in Group 1 and Group 2, no further explanation will be necessary. In Group 3, the elements are also similar to those in Group 1, with the exception that the exciting winding of the transformer secondary is omitted.

The alternating current flowing through the winding $P_1$ of the transformer T, induces an alternating potential across the winding $SF_1$, which causes current to flow through the filaments of the rectifier tubes $R_1$ and $R'_1$, and also induces an alternating potential across the winding $SP_1$ which is applied directly to the plates of the rectifier tubes and indirectly through the direct current circuit to the midpoint of the winding $SF_1$. Rectifying action will take place between the filament and plate of the rectifier when the plate of $R_1$ is positive, and similarly, rectifying action will take place between the filament and plate of the rectifier $R'_1$ when the plate of $R'_1$ is positive. The potential induced between the terminals of the winding $SP_1$ is such that the potential of the rectified current from unit 1 is one-third of the total desired direct current potential. The rectifying action in Groups 2 and 3 takes place in a similar manner.

The path of the direct current through the several groups may be traced as follows: Starting at the negative terminal NT of Group 1, which is at ground potential, the circuit is traced to the midpoint $MP_1$ of the secondary winding $SP_1$, then in parallel paths through the rectifier tubes $R_1$ and $R'_1$ and the filaments associated therewith to the midpoint $MF_1$ of the secondary winding $SF_1$. The direct current then passes from the midpoint $MF_1$ of the secondary $SF_1$ through the inductance coil $L_1$ to the midpoint $MP_2$ of the secondary winding $SP_2$ of transformer $T_2$. The current then flows in parallel paths through the rectifier tubes $R_2$ and $R'_2$ and the filaments associated therewith, to the midpoint $MF_2$ of the secondary winding $SF_2$. Then the current flows through the inductance coil $L_2$ to the midpoint $MP_3$ of the secondary winding $SP_3$ of transformer $T_3$. The current again flows in parallel paths through the rectifier tubes $R_3$ and $R'_3$ and the filaments associated therewith, to the midpoint $MF_3$ of the secondary winding $SF_3$ of transformer $T_3$, from which point the current flows through the inductance coil $L_3$ to the high potential terminal PT.

In each group a condenser and inductance coil together form a filter, the condenser $C_1$ and inductance coil $L_1$ forming the filter in Group 1, the condenser $C_2$ and inductance coil $L_2$, the filter in Group 2, and condenser $C_3$ and inductance coil $L_3$, the filter in Group 3. The condenser $C_1$ is connected between the midpoints $MP_1$ and $MF_1$ of the secondary windings $SP_1$ and $SF_1$, respectively, and therefore the entire potential produced in Group 1 is concentrated on the plates thereof. It will be understood that a filter having a plurality of elements may be employed in place of the single element filter represented in the figure in order to render the direct current in the secondary circuit as substantially free from alternating current waves as may be found desirable. By means of the particular arrangement disclosed in Fig. 1, it is possible to obtain a high voltage direct current the potential of which is three times as great as that which can be obtained from a single group.

Figure 2:
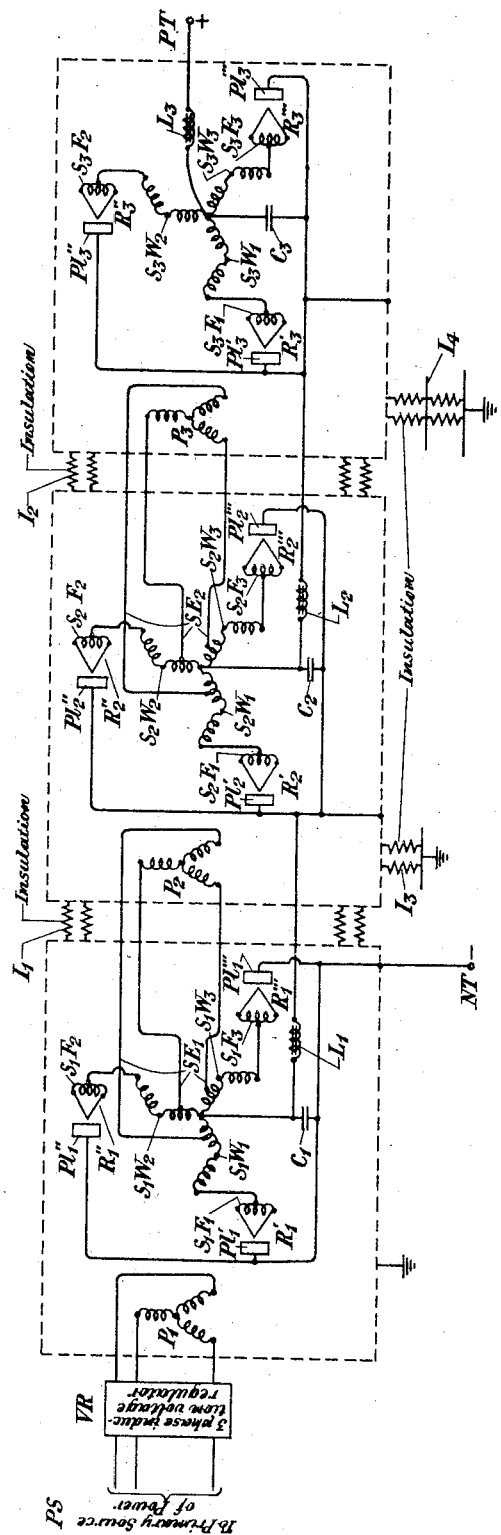

In Fig. 2, there is illustrated a similar arrangement for obtaining high voltage rectified current from a three-phase alternating current source of power. Three groups are illustrated connected in cascade, each comprising a transformer, rectifiers and a selective device. The primary $P_1$ in Group 1 is connected to the primary source of power PS through a three-phase inductive voltage regulator VR. The secondary $S_1$ is arranged in an inter-connected star combination in order to balance out the magnetic field of the direct current in said secondary. An auto transformer is tapped out from the three windings of the secondary $S_1W_1$, $S_1W_2$ and $S_1W_3$, this auto transformer being employed as a means for exciting the primary $P_2$ of the transformer $T_2$ in Group 2. The secondary windings $S_1F_1$, $S_1F_2$ and $S_1F_3$, each connected to a filament in rectifiers $R'_1$, $R''_1$, and $R'''_1$, are placed adjacent to the high potential end of the secondary $S_1$, the midpoints of said windings being connected to the high potential ends of windings $S_1W_1$, $S_1W_2$ and $S_1W_3$, respectively. It will be understood that the primary $P_1$, windings $S_1W_1$, $S_1W_2$, $S_1W_3$, and windings $S_1F_1$, $S_1F_2$ and $S_1F_3$ are all wound on a common core.

The condenser $C_1$ and inductance $L_1$ form an element of a filter in Group 1. It will be understood that a plurality of such elements may be employed for rendering the direct current as free of alternating current waves as may be found desirable. Similar arrangements are provided for Groups 2 and 3.

The circuit for the direct current throughout the system may be traced as follows: From the negative terminal NT of Group 1 to the plates $PL'_1$, $PL''_1$ and $PL'''_1$ of the rectifier tubes $R'_1$, $R''_1$, $R'''_1$, respectively, then through the tubes to the windings $S_1F_1$, $S_1F_2$ and $S_1F_3$ to the high potential ends of windings $S_1W_1$, $S_1W_2$ and $S_1W_3$, respectively, and then through said latter windings to the midpoint of $S_1$. The rectified current then flows through the inductance $L_1$ to the plates $PL'_2$, $PL''_2$ and $PL'''_2$ of the rectifiers $R'_2$, $R''_2$ and $R'''_2$, respectively, then flows through the tubes to the windings $S_2W_1$, $S_2W_2$ and $S_2W_3$ to the apex of the secondary $S_2$. The current then flows through the inductance $L_2$ to the plates $PL'_3$, $PL''_3$, $P'''_3$ in Group 3. The path of the current is then traced through the rectifiers and windings $S_3W_1$, $S_3W_2$ and $S_3W_3$ to the apex of the secondary $S_3$, then through inductance $L_3$ to the high potential positive terminal PT.

In Group 1, the condenser $C_1$ is connected between the plates $PL'_1$, $PL''_1$ and $PL'''_1$ and the midpoint of the secondary, which is at a higher potential. The inductance $L_1$ is connected between the midpoint of the secondary $S_1$ and the plates $PL'_2$, $PL''_2$ and $PL'''_2$ in Group 2. The condensers and inductances are similarly connected in the Groups 2 and 3.

In the system employed in Fig. 2, Group 1 is at the ground potential and Group 2 is insulated from Group 1 by means of insulation $I_1$, and is also insulated from ground by means of insulation $I_3$ for a potential equal to that developed in Group 1. Group 3 is insulated from Group 2 by means of insulation $I_2$ for a potential developed in Group 2 and is further insulated from ground by means of insulation $I_4$ for twice the potential developed in Group 1. The direct current obtainable in such an arrangement will have a potential which is three times that developed in a single group.

It is, of course, one of the features of the invention shown in both figures of the drawings, that the voltage of the alternating current emanating from the source PS may be successively increased as it becomes impressed upon the secondary windings $SE_1$ and $SE_2$ of the transformers $T_1$ and $T_2$ respectively.

Similar arrangements may be employed for obtaining high voltage direct current for the operation of radio transmitting sets and for power transmission systems employing high voltage direct current. It will be understood that while only three units have been illustrated in the drawings, any number of units may be similarly connected to obtain any desired direct current potential.

While only certain particular embodiments of the invention have been disclosed which are deemed desirable, it will be understood that it is capable of embodiment in other and widely varied organizations without departing from the spirit of the invention as defined in the appended claims.

What is claimed is:

1. A system for transforming alternating current of low voltage into direct current of higher voltage comprising a low voltage source of alternating current, a plurality of transformers, a plurality of rectifiers, each rectifier being associated with a corresponding transformer, means to additively combine the voltage effects of said rectifiers, the primary of the first transformer being connected to said low voltage source of alternating current, the secondaries of the transformers each being composed of three windings, one winding being employed for supplying the potential required to heat the filaments of the tubes in the rectifier associated therewith, another winding being employed to impress the necessary potential on the plates of the tubes in said rectifier, and the third winding being employed to energize the primary winding of the next succeeding transformer.

2. A system for transforming alternating current of low voltage into direct current of high voltage comprising a source of low voltage alternating current, a voltage regulator, a plurality of transformers, a plurality of rectifiers, one rectifier being associated with each transformer, the primary of the first transformer being connected to said voltage regulator and said low voltage alternating current source, the secondary of said first transformer having three windings, one for heating the cathodes of the rectifier associated therewith, another for furnishing the potential for the anodes of said rectifier, and a third for energizing the primary of the succeeding transformer, the secondaries of the other transformers being similarly arranged so that a direct current is supplied conjointly from the secondaries of the various transformers in the system which will be of a potential as many times the potential produced by a single transformer and its associated rectifier as there are transformers employed in the system.

In testimony whereof, I have signed my name to this specification this 23rd day of September 1925.

DE LOSS K. MARTIN.